United States Patent Office 3,534,045
Patented Oct. 13, 1970

3,534,045
THIOPYRANO[3,4-e]PYRANS
Max von Strandtmann, Rockaway, Marvin P. Cohen, New Milford, and John Shavel, Jr., Mendham, N.J., assignors to Warner-Lambert Pharmaceutical Company, Morris Plains, N.J., a corporation of Delaware
No Drawing. Filed May 8, 1967, Ser. No. 636,671
Int. Cl. C07d 65/14
U.S. Cl. 260—289                     3 Claims

ABSTRACT OF THE DISCLOSURE

Thiopyrano[3,4-e]pyrans of formula:

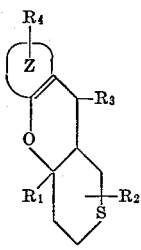

I have been disclosed. $R_1$ represents hydroxy or various amino groups; $R_2$ and $R_3$ represent hydrogen, alkyl, aralkyl, aryl; Z is an aromatic or heteroaromatic nucleus; and $R_4$ represents hydrogen or various amino, nitro, alkoxy, alkyl, aryl, and halogen substituents.

---

The present invention relates to a new class of thiopyrano[3,4-e]pyrans of the Formula I:

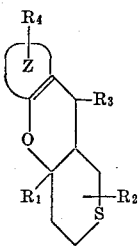

wherein $R_1$ represents hydroxy, dilower alkylamino, diaralkylamino, lower alkyl arylamino, pyrrolidino, piperazino, morpholino, or piperidino; $R_2$ and $R_3$ each represent hydrogen, lower alkyl, cycloalkyl, aryl, and aralkyl; Z represents an aromatic or heteroaromatic nucleus, such as benzene, naphthalene, phenanthrene, pyridine, quinoline, isoquinoline, carbazole, and the like; and $R_4$ represents hydrogen, halogen, nitro, lower alkoxy, amino, dialkylamino, alkylamino, lower alkyl, and aryl.

In the above definitions for $R_1$, $R_2$, $R_3$, $R_4$, and Z, and $R_5$ and $R_6$ below, the term lower alkyl and the lower alkyl portions of aryl, aralkyl, alkylamino, and lower alkoxy is meant to include from 1 to 6 carbon atoms, such as methyl, ethyl, propyl, isopropyl, butyl, isobutyl, pentyl, and the like. The term aryl is meant to include both aromatic as well as heteroaromatic substituents, such as phenyl, pyridyl, furyl, and the like. The term cycloalkyl is meant to include from 3 to 6 carbon atoms, such as cyclopropyl, cyclobutyl, cyclopentyl, cyclohexyl, and the like; and the term halogen is meant to include all four members of its family, i.e., chlorine, bromine, fluorine, and iodine.

The compounds of this invention exhibit myotonic activity when administered to a mammalian body. Accordingly, they are useful in conditions where increased muscle tone is desired as, for example, in geriatrics and other muscle debilitating states. Generally, an oral dose of about 125 to 250 mg., several times daily, is recommended to produce the desired increase in myotonic activity. In order to use these compounds, they are combined with a known pharmaceutical carrier, such as, for example, lactose, starch, dicalcium phosphate, mannitol, and the like to form dosage forms such as tablets, powders, capsules, and the like. These dosage forms may be prepared in accordance with known pharmaceutical compounding art.

According to the process of our invention, the above compounds may be prepared by procedures as follows:

PROCEDURE A

In this procedure a compound of the structure II:

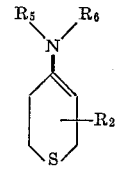

II wherein $R_5$ and $R_6$ may be lower alkyl, aralkyl, aryl, or $R_5$ and $R_6$ taken together with the nitrogen atom to which they are attached form a morpholine, pyrrolidine, piperazine, or piperidine ring, is heated with an equivalent amount of a compound of the Formula III:

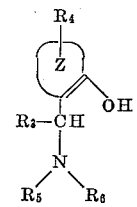

III in an inert solvent preferably dioxane at a temperature of about 70° to 90° C. until no compound of the formula:

is detectable in the vapors by odor or pH measurements; this compound is a byproduct of the main reaction. At this point water is added and the mixture is heated at a temperature of about 90° to 98° C. for an additional hour. The addition of water is omitted in the case when $R_1$ in the final product is an amino group, that is dilower alkylamino, pyrrolidino, morpholino, piperazino, or piperidino.

Suitable other solvents which may be used in connection with this procedure are, for example, toluene, xylene, tetrahydrofuran, and the like.

PROCEDURE B

Procedure B involves the reaction of the compound of Formula IV:

IV with compound III without any solvent at a temperature of about 150° C. employing analogous reaction conditions as described for Procedure A except that heating with water at 90° to 98° C. is entirely omitted. Procedure B is limited to those cases where in the final products $R_1$ is not an amino group.

Those compounds which correspond to Formula I above wherein $R_1$ represents hydroxy, may be further treated to give new derivatives, for example, they may be treated with a peroxide, such as, hydrogen peroxide, or peroxycarboxylic acid to give sulfoxides and sulfones of the Formula V and the Formula VI, respectively:

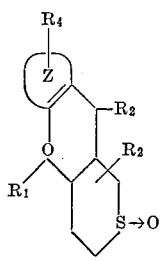

V

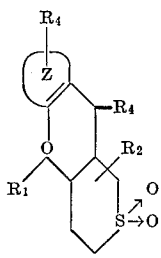

VI

These compounds, V and VI, which also exhibit myotonic activity and are useful in increasing the muscle tone of a mammalian host are also included within the scope of this invention.

The starting phenolic Mannich bases III are prepared according to the methods described in "α-Aminoalkylierung" by H. Hellmann and G. Optiz, Verlag Chemie G.b.m.H. Weinhein, Germany, 1960.

The tetrahydro-1,4-thiopyrans used are prepared according to E. A. Fehnl and M. Cormack, J. Am. Chem. Soc. 70, 1813 (1948). They were converted to enamines II according to standard methods such as that described by G. Stork et al., J. Am. Chem. Soc. 85, 207 (1963).

The basic compounds of this invention also form acid addition salts with pharmaceutically acceptable acids, such as hydrochloric acid, hydrobromic acid, hydriodic acid, nitric acid, phosphoric acid, and sulfuric acid; acetic acid, citric acid, tartaric acid, lactic acid, benzenesulfonic acid, toluene sulfonic acid, etc. These acid addition salts are also included within the scope of this invention.

The following examples are included in order further to illustrate the invention. Temperatures given therein are degrees centigrade and room temperatures are about 20 to 30° C.

EXAMPLE 1

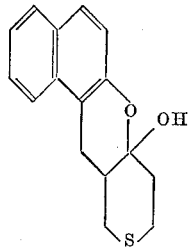

8,9,11a,12 - tetrahydro - 7aH,11H-naphtho[2,1-b]thiopyrano[3,4-e]pyran-7a-ol: A solution of 5 g. of 1-dimethylaminomethyl-2-naphthol, and 4.6 g. of piperidine enamino of tetrahydrothio-4H-pyran-4-one in 25 ml. of dioxane is refluxed for 5 hr. under a stream of nitrogen. The solution is treated with 5 ml. of $H_2O$, refluxed for 2 hr. and evaporated in vacuo. The residual gum is dissolved in ethylacetate and the solution is passed through a 400 g. Florisil column. The fractions which crystallize on concentration are combined, and recrystallized from absolute EtOH, to yield 4 g. (59%) of 8,9,11a,12-tetrahydro - 7aH,11H-naphtho[2,1-b]thiopyrano[3,4-e]pyran-7a-ol, M.P. 147–149°; $\lambda_{max}$ mμ (ε) 210 (30,000), 252 (9,800), 344 (30,000), $\gamma_{max}$ 745 (m.), 805 (m.s.), 915 (m.s.), 975 (m.s.), 1000 (s.), 1175 (m.), 1595 (m.), 1620 (m.), 3400 (m.s.), cm.$^{-1}$.

*Analysis.*—Calcd. for $C_{16}H_{16}O_2S$ (percent): C, 70.56; H, 5.92; S, 11.77. Found (percent): C, 70.49; H, 6.03, S, 11.69.

EXAMPLE 2

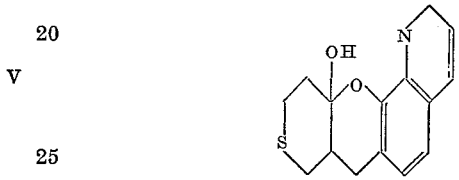

7,7a,10,11 - tetrahydro-8H,11aH-thiopyrano[3',4':5,6]pyrano-[3,2-h]quinolin-11a-ol: A solution of 20 g. of 7-dimethylaminomethylquinolin - 8 - ol, and 18.1 g. of piperidine enamine of tetrahydrothio-4H-pyran-4-one in 100 ml. of dioxane is refluxed for 5 hr. under a stream of nitrogen.. The solution is treated with 20 ml. of $H_2O$, and refluxed 1 hr. The solvents are removed under reduced pressure, and the residual gum is crystallized from $CH_3CN$ to yield 5.3 g. (19%) of 7,7a,10,11-tetrahydro-8H,11aH - thiopyrano[3',4':5,6]pyrano-[3,2-h]quinolin-11a-ol, M.P. 140–143°; $\lambda_{max}$ mμ (ε) 245 (46,800), 308 (3,000); $\gamma_{max}$ 740 (m.s.), 785 (m.s.), 825 (m.s.), 960 (m.s.), 1010 (s.), 1090 (s.), 1150 (m.), 1235 (m.s.), 1310 (m.s.), 1500 (m.s.), 1600 (m.w.), 3150 (m.s.) cm.$^{-1}$.

*Analysis.*—Calcd. for $C_{15}H_{15}NO_2S$ (percent): C, 65.91; H, 5.53; N, 5.12; S, 11.73. Found (percent): C, 66.00; H, 5.72; N, 5.26; S, 11.56.

EXAMPLE 3

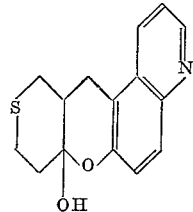

8,9,11a,12 - tetrahydro - 7aH,11H - thiopyrano[3',4':5,6]pyrano[3,2-f]quinolin-7a-ol: This is prepared from 5 g. of 5-dimethylaminomethyl-6-quinolinol, and 4.6 g. of piperidine enamine of tetrahydrothio-4H-pyran-4-one in analogous fashion to 7,7a,10,11-tetrahydro-8H,11aH-thiopyrano[3',4':5,6]pyrano[3,2-h]quinolin - 11a-ol (Example 2). The material is recrystallized from absolute EtOH, to yield 2 g. (29%) of 8,9,11a,12-tetrahydro-7aH,11H - thiopyrano[3',4':5.6]pyrano[3,2 - f]quinolin-7a-ol, M.P. 238–241°; $\lambda_{max}$ mμ (ε) 240 (44,700); 284 (3,600), 326 (4,000); $\gamma_{max}$ 655 (m.), 805 (m.), 815 (m.s.), 925 (m.s.), 975 (m.s.), 990 (s.), 1050 (m.s.), 1170 (m.), 1240 (m.s.), 1510 (m.w.), 1600 (m.w.), 1615 (m.) cm.$^{-1}$.

*Analysis.*—Calcd. for $C_{15}H_{15}NO_2S$ (percent): C, 65.91; H, 5.53; N, 5.12; S, 11.73. Found (percent): C, 65.96; H, 5.74; N, 5.34; S, 11.52.

EXAMPLE 4

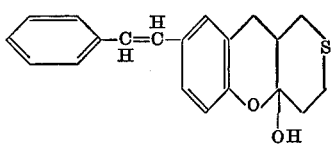

Trans 3,4,10,10a-tetrahydro - 8 - styryl-1H,4aH-thiopyrano[4,3-b][1]benzopyran-4a-ol: A solution of 20 g. of 3[(dimethylamino)methyl] - 4 - stibenol, and 14.2 g. of piperidine enamine of tetrahydrothio-4H-pyran-4-one in 100 ml. of dioxane is refluxed under a stream of nitrogen for 24 hr. The solution is treated with 20 ml. of $H_2O$, and refluxed for 1.5 hr. The solvents are removed under reduced pressure, and the residual gum is crystallized from $CH_3CN$ to yield 5 g. (19%) of trans 3,4,10,10a-tetrahydro-8-styryl-1H,4aH - thiopyrano[4,3-b][1]benzopyran-4a-ol, M.P. 170–173°; $\lambda_{max}$ m$\mu$ ($\epsilon$) 232 (15,900), 304 (30,000), 319 (30,700); $\gamma_{max}$ 680 (m.), 715 (n.w.), 820 (m.), 925 (m.s.), 960 (m.s.), 1000 (s.), 1050 (m.w.), 1100 (m.), 1170 (m.w.), 1210 (m.), 1240 (m.s.), 1505 (m.s.), 1590 (m.w.), 3425 (m.s.) cm.$^{-1}$.

*Analysis.*—Calcd. for $C_{20}H_{20}O_2S$ (percent): C, 74.04; H, 6.21; S, 9.88. Found (percent): C, 73.93; H, 6.12; S, 9.81.

EXAMPLE 5

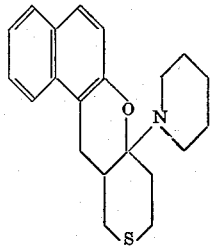

8,9,11a,12 - tetrahydro-7a-piperidino-7aH,11H-naphtho-[2,1-b]thiopyrano[3,4-c]pyran: The solution of 10 g. of 1-dimethylaminomethyl-2-naphthol, and 9 g. of piperidino enamine of tetrahydrothio-4H-pyran-4-one in 50 ml. of dioxane is refluxed under a stream of nitrogen for 5 hr. The solvent is then removed under reduced pressure, and the residual gum recrystallized from acetonitrile, to yield 6.5 g. (38%), M.P. 149–153°; $\lambda_{max}$ m$\mu$ ($\epsilon$) 234 (72,000), 267 (3,900), 278 (4,500), 290 (3,300), 319 (2,000), 333 (2,500); $\gamma_{max}$ 740 (m.), 810 (s.), 915 (s.), 960 (m.s.), 1075 (m.s.), 1115 (m.), 1190 m.), 1230 (m.s.), 1600 (m.), 1625 (m.), cm.$^{-1}$.

*Aanalysis.*—Calcd. for $C_{21}H_{25}NSO$ (percent): C, 74.30; H, 7.42; S, 9.44. Found (percent): C, 74.21; H, 7.42; S, 9.43.

EXAMPLE 6

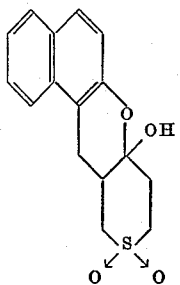

8,9,11a,12 - tetrahydro-7aH,11H-naphtho[2,1-b]thiopyrano[3,4-e]pyran-7a-ol 10,10-dioxide: To a solution of 12 g. of 8,9,11a,12 - tetrahydro-7aH,11H - naptho[2,1-b]thiopyrano-[3,4-e]pyran-7a-ol in 300 ml. of glacial acetic acid, 50 ml. of 30% $H_2O_2$ is added dropwise with stirring. The solution is allowed to stand at room temperature for 18 hr., and is diluted to 2 litres with $H_2O$. The flocculent precipitate is filtered, washed with cold $H_2O$, and recrystallized from glacial acetic acid, to yield 7 g. (53%) of 8,9,11a,12 - tetrahydro-7aH,11H-naphtho[2,1-b]thiopyrano[3,4-e]pyran - 7a - ol 10,10-dioxide, M.P. 266–268°; $\lambda_{max}$ m$\mu$ ($\epsilon$) 231 (82,800), 266 (4,000), 276 (5,000), 287 (4,000), 316 (1,800), 329 (2,200); $\gamma_{max}$ 745 (m.), 800 (m.s.), 870 (m.), 970 (m.), 1015 (s.), 1100 (m.s.), 1125 (s.), 1225 (m.s.), 1275 (s.), 1600 (m.w.), 1625 (m.w.), 3450 (m.s.), cm.$^{-1}$.

*Analysis.*—Calcd. for $C_{16}H_{16}O_4S$ (percent): C, 63.14; H, 5.30; S, 10.53. Found (percent): C, 63.44; H, 5.48; S, 10.54.

EXAMPLE 7

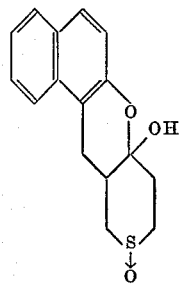

8,9,11a,12 - tetrahydro-7aH,11H-naphtho[2,1-b]thiopyrano[3,4-e]pyran-7a-ol 10-oxide: To a cooled solution of 2 g. 8,9,11a,12 - tetrahydro-7aH,11H-naphtho[2,1-b]thiopyrano-[3,4-e]pyran-7a-ol in 50 ml. of glacial acetic acid, is added 7 ml. of 10% $H_2O_2$ solution dropwise with stirring. The solution is allowed to remain at room temperature for 18 hr. A small amount of unreacted starting material is filtered off, and the filtrate is diluted with $H_2O$, and the white precipitate that forms is filtered, washed with $H_2O$ and recrystallized from absolute EtOH to yield 0.5 g. (24%) of 8,9,11a,12-tetrahydro-7aH,11H-naphtho[2,1-b]thiopyrano[3,4-e]pyran - 7a - ol 10-oxide, M.P. 243–247°; $\lambda_{max}$ m$\mu$ ($\epsilon$) 231 (84,200); 265 (5,000), 276 (6,000), 287 (4,700), 316 (2,400), 330 (3,000); $\gamma_{max}$ 750 (m.), 810 (m.), 890 (m.w.), 985 (m.s.), 1010 (m.s.), 1155 (m.), 1225 (m.), 1600 (m.w.), 1620 (m.w.), 3200 (m.) cm.$^{-1}$.

*Analysis.*—Calcd. for $C_{16}H_{16}O_3S$ (percent): C, 66.64; H, 5.59; S, 11.11. Found (percent): C, 66.63; H, 5.63; S, 10.86.

It is understood that the foregoing detailed description is given merely by way of illustration and that many variations may be made therein without departing from the spirit of our invention.

Having described our invention, what we desire to secure by Letters Patent is:

1. A compound of the Formula I:

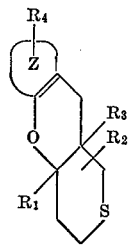

wherein $R_1$ represents hydroxy, piperidino; $R_2$ and $R_3$ each represent hydrogen; Z represents quinoline, styrylbenzo; and $R_4$ represents hydrogen, halogen, nitro, lower alkoxy, amino, diloweralkylamino, lower alkylamino, lower alkyl of 1 to 6 carbon atoms, or phenyl and its acid addition salts.

2. A member selected from the group consisting of compounds of the formulas:

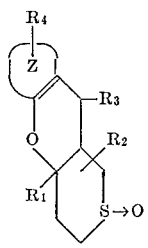

V

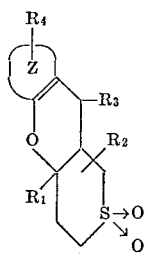

VI wherein $R_1$ represents hydroxy, or piperidino; $R_2$ and $R_3$ each represent hydrogen; Z represents quinoline, styrylbenzo; and $R_4$ represents hydrogen, halogen, nitro, lower alkoxy, amino, diloweralkylamino, lower alkylamino, lower alkyl of 1 to 6 carbon atoms, or phenyl.

3. 8,9,11a,12 - tetrahydro - 7aH,11H - thiopyrano-[3',4':5,6]pyrano[3,2-f]quinolin-7a-ol.

References Cited

UNITED STATES PATENTS 2,951,851   9/1960   Fusco et al. _____ 260—342.2

OTHER REFERENCES

Von Strandtmann et al.: Tetrahedron Letters No. 35, pp. 3103 to 3106 (1965).

Losco et al.: Gazz. Chim. Ital., vol. 89, pp. 1298, 1300, 1304, 1310 and 1311 (1959).

JOHN D. RANDOLPH, Primary Examiner

U.S. Cl. X.R.

260—240, 247.1, 268, 288, 293.4, 327; 424—275